(12) United States Patent
Svendsen et al.

(10) Patent No.: US 7,290,758 B2
(45) Date of Patent: Nov. 6, 2007

(54) LEAF SPRING ASSEMBLY WITH RETAINING DEVICE

(75) Inventors: Melvin Svendsen, 269 Douglas Park Blvd., SE., Calgary, Alberta (CA) T2Z 2R2; Donald Stoesz, Langdon (CA); Simon Feng, Calgary (CA); Luc Jarry, Calgary (CA); Marty Boll, Calgary (CA)

(73) Assignees: Melvin Svendsen, Calgary, Alberta (CA); Gerald C. Lockey, Calgary, Alberta (CA)

( * ) Notice: Subject to any disclaimer, the term of this patent is extended or adjusted under 35 U.S.C. 154(b) by 22 days.

(21) Appl. No.: 11/213,664

(22) Filed: Aug. 29, 2005

(65) Prior Publication Data

US 2007/0045915 A1    Mar. 1, 2007

(51) Int. Cl.
*B60G 11/02* (2006.01)
*F16F 1/18* (2006.01)
(52) U.S. Cl. ........................ 267/51; 267/37.1
(58) Field of Classification Search ............... 267/7, 267/229, 36.1, 37.1, 37.2, 37.3, 40, 51, 52, 267/53
See application file for complete search history.

(56) References Cited

U.S. PATENT DOCUMENTS

| 1,475,270 | A | * | 11/1923 | Metzger | 267/37.1 |
|---|---|---|---|---|---|
| 1,558,750 | A | * | 10/1925 | Mulot | 267/47 |
| 1,736,113 | A | * | 11/1929 | Dotson | 267/51 |
| 1,762,954 | A | * | 6/1930 | Stanley | 267/37.2 |
| 2,052,930 | A | * | 9/1936 | Laursen | 267/47 |
| 2,102,061 | A | * | 12/1937 | Crabtree | 267/37.3 |
| 2,157,418 | A | * | 5/1939 | Lippitt | 267/37.2 |
| 2,735,813 | A | * | 2/1956 | Denman | 508/102 |
| 6,364,333 | B1 | * | 4/2002 | Atkinson | 280/124.175 |
| 2002/0117787 | A1 | * | 8/2002 | Beaudoin et al. | 267/41 |

* cited by examiner

*Primary Examiner*—Devon Kramer
(74) *Attorney, Agent, or Firm*—Adrian D. Battison; Michael R. Williams; Ryan W. Dupuis

(57) ABSTRACT

A leaf spring assembly includes a safety strap extending along the bottom of a plurality of stacked leaf springs that are held in a stacked relationship by a leaf fastener. The strap is attached to each leaf spring in the stack by fasteners at opposite ends of the spring such that adjacent leaf springs are connected on each side of the fastener. In the event that any one of the springs fails between the leaf fastener and one of the ends at which the strap is attached, the broken pieces of the spring remain connected to the other springs in the stack. This prevents pieces from breaking free of the assembly and creating road hazards in the event of spring failure.

19 Claims, 3 Drawing Sheets

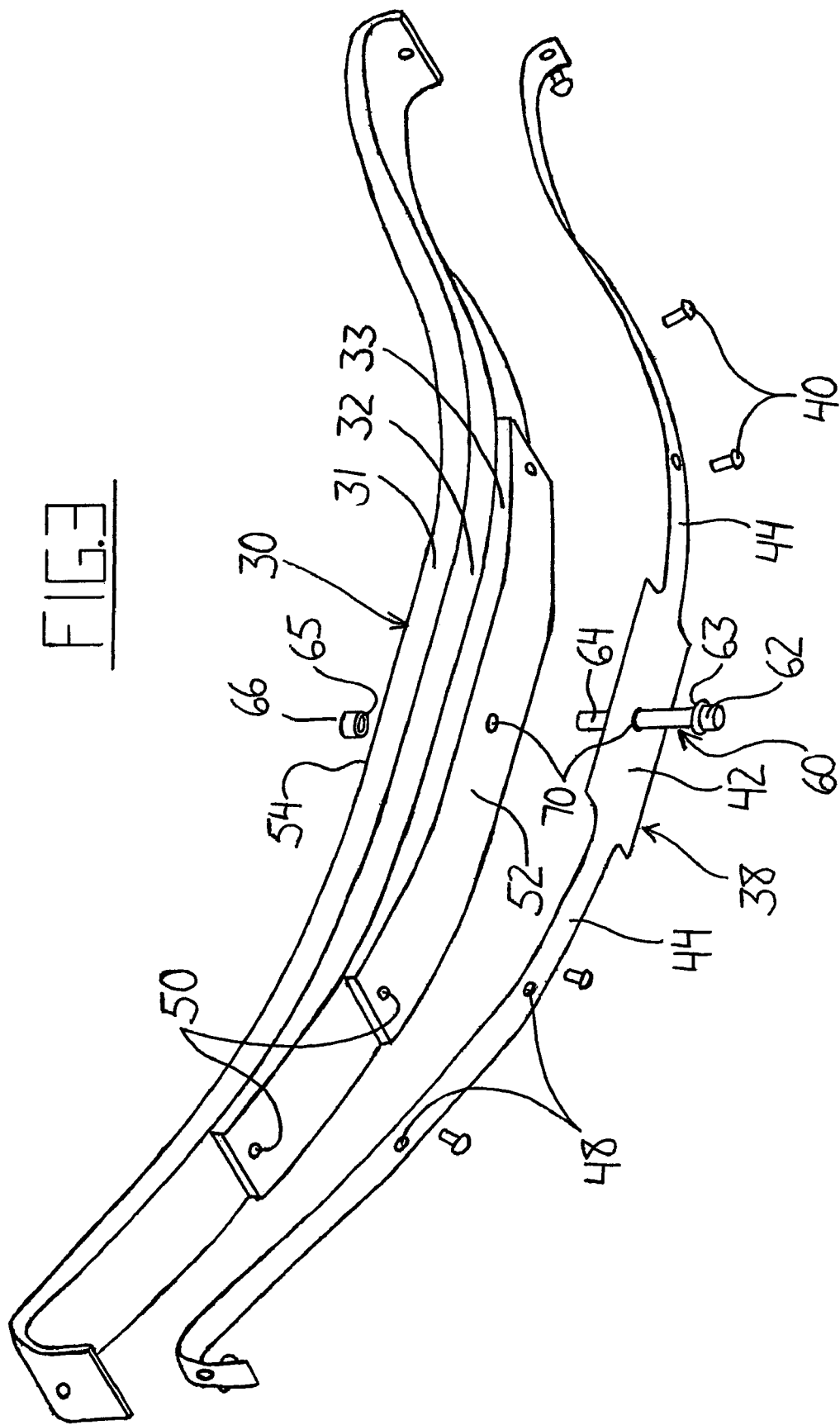

LEAF SPRING ASSEMBLY WITH RETAINING DEVICE

This invention relates generally to leaf spring suspension assemblies, and more particularly to a way to retain fractured pieces of a leaf spring on a leaf spring assembly in the event of leaf spring failure.

BACKGROUND OF THE INVENTION

Leaf spring assemblies are conventionally used for suspending one component relative to another. Vehicle suspension is one example of an application using such assemblies. However a leaf spring assembly can be used in many different situations and the present invention is applicable to any of these and is not intended to be limited to vehicle suspensions.

A four spring suspension system used extensively in the highway transportation trailer industry features four leaf spring assemblies. Each of these leaf spring assemblies includes a plurality of individual leaf springs of varying lengths stacked one atop the other and connected together at approximately a center point along their length. The longest leaf spring has its ends shaped to be supported on spring hangers attached to the frame of the vehicle. An axle seat is attached to the center of the leaf spring between the two ends for attachment to an axle of the vehicle. In this particular suspension system, leaf spring assemblies on separate axles are connected at a common hanger to an equalizer which distributes the vehicle weight between the two axles.

Typically, these leaf spring systems do not incorporate deflection limitation devices to protect the leaf springs from potential failure precipitated by overloading. Instead, this type of suspension relies on significant safety factors within the design to protect against overload. If overload does occur the leaf spring may fracture and there is no method of containing the fractured pieces within the vehicle. Subsequently, if a spring fails, the broken pieces generally dislodge from the vehicle and represent a danger to the public. As a result, there is a demand for a device that protects the public by assuring that in the event of a leaf spring fracture within the leaf spring assembly, the components remain attached and continue to travel with the vehicle.

SUMMARY OF THE INVENTION

According to a first aspect of the invention there is provided a leaf spring assembly comprising:

a plurality of stacked leaf springs including a top spring defining a top surface and a bottom spring defining a bottom surface;

a leaf fastener arranged to hold said leaf springs in a stacked relationship; and a retaining device attached to each leaf spring at points on opposite sides of the leaf fastener such that adjacent leaf springs of the plurality of stacked leaf springs are connected by said retaining device on each side of said leaf fastener;

the retaining device thereby arranged such that if any one of the leaf springs break into two pieces between the leaf fastener and one of the points, only one of said two pieces thereby being held in the stacked relationship by the leaf fastener, the other one of said two pieces remains connected to at least one other leaf spring.

The retaining device of the present invention retains broken parts of a failed leaf spring with the assembly. Keeping such parts with a vehicle using the assembly prevents subsequent damage to the public by keeping the parts out of the general roadway. A leaf spring typically fails in the area near the leaf fastener, so by attaching the retaining device on opposite sides of the fastener, a fractured piece of a leaf spring stays secured to the other springs. The retaining device can be added to existing types of leaf spring assemblies without design changes or excessive modifications.

Preferably the retaining device is disposed beneath and adjacent to the plurality of stacked leaf springs.

Preferably the retaining device comprises a strap.

Preferably the strap extends from a first end of the plurality of stacked leaf springs to a second end thereof opposite said first end.

Preferably the strap is attached to each leaf spring at opposite ends thereof.

Preferably there is provided retaining device fasteners for attaching the retaining device to each leaf spring on the opposite sides of the leaf fastener.

Preferably the leaf spring assembly further comprises a mounting coupling for attachment to the stacked leaf springs.

Preferably the mounting coupling comprises a first mounting element for placement against either one of the top surface and the strap adjacent the bottom surface and a second mounting element for placement against the other one of the top surface and the strap adjacent the bottom surface in opposition to the first mounting element such that said strap is clamped between the bottom spring and one of the first and second mounting elements. The retaining device can be used in either over-slung or under-slung axle mounting arrangements and the clamping of the strap ensures that the broken pieces of a failed spring remain with the vehicle on which the assembly is mounted, as the pieces are not only secured to the other springs, but to the axle as well.

Preferably the first and second mounting elements are clamped together by bolts.

Preferably the leaf spring assembly further comprises an axle wherein the second mounting element comprises a first cradle for engaging a first side face of the axle and the bolts are U-bolts.

In this case, the first mounting element may comprise a plate and the U-bolts may engage around the axle to clamp the first cradle between the axle and the plate. Alternatively, the second mounting element may further comprise a second cradle for engaging a second side face of the axle opposite the first side face and the U-bolts may engage around the first mounting element to clamp the axle between the second first and second cradles and the first cradle between the axle and the first mounting element. In other words, the retaining device can be used with either standard or inverted U-bolt axle mounts known in the art.

Preferably each of the first and second mounting elements have a hole, said holes arranged to receive opposite end portions of the leaf fastener, each end portion disposed on a respective one of the top and bottom surfaces of the plurality of stacked leaf springs.

Preferably the opposite end portions of the leaf fastener are connected by a shaft portion passing through aligned holes in the leaf springs and the strap, each end portion defining a shoulder abutting a respective one of the top surface and said strap adjacent the bottom surface such that said leaf springs and said strap are clamped between said shoulders.

According to a second aspect of the invention there is provided a leaf spring assembly comprising:
a plurality of stacked leaf springs;
a leaf fastener to hold the leaf springs in a stacked relationship; and
a retaining device extending along the plurality of stacked leaf springs beneath and adjacent to said plurality of stacked leaf springs;
the retaining device being attached to each leaf spring at points on opposite sides of the leaf fastener such that adjacent leaf springs of the plurality of stacked leaf springs are connected by said retaining device on each side of said leaf fastener;
the retaining device thereby arranged such that if any one of the leaf springs break into two pieces between the leaf fastener and one of the points, only one of said two pieces thereby being held in the stacked relationship by the leaf fastener, the other one of said two pieces remains connected to at least one other leaf spring.

BRIEF DESCRIPTION OF THE DRAWINGS

In the accompanying drawings, which illustrate an exemplary embodiment of the present invention:
FIG. 3 is an exploded isometric view of the leaf springs and safety strap of the leaf spring assembly of FIG. 1.

DETAILED DESCRIPTION

Figure 1:
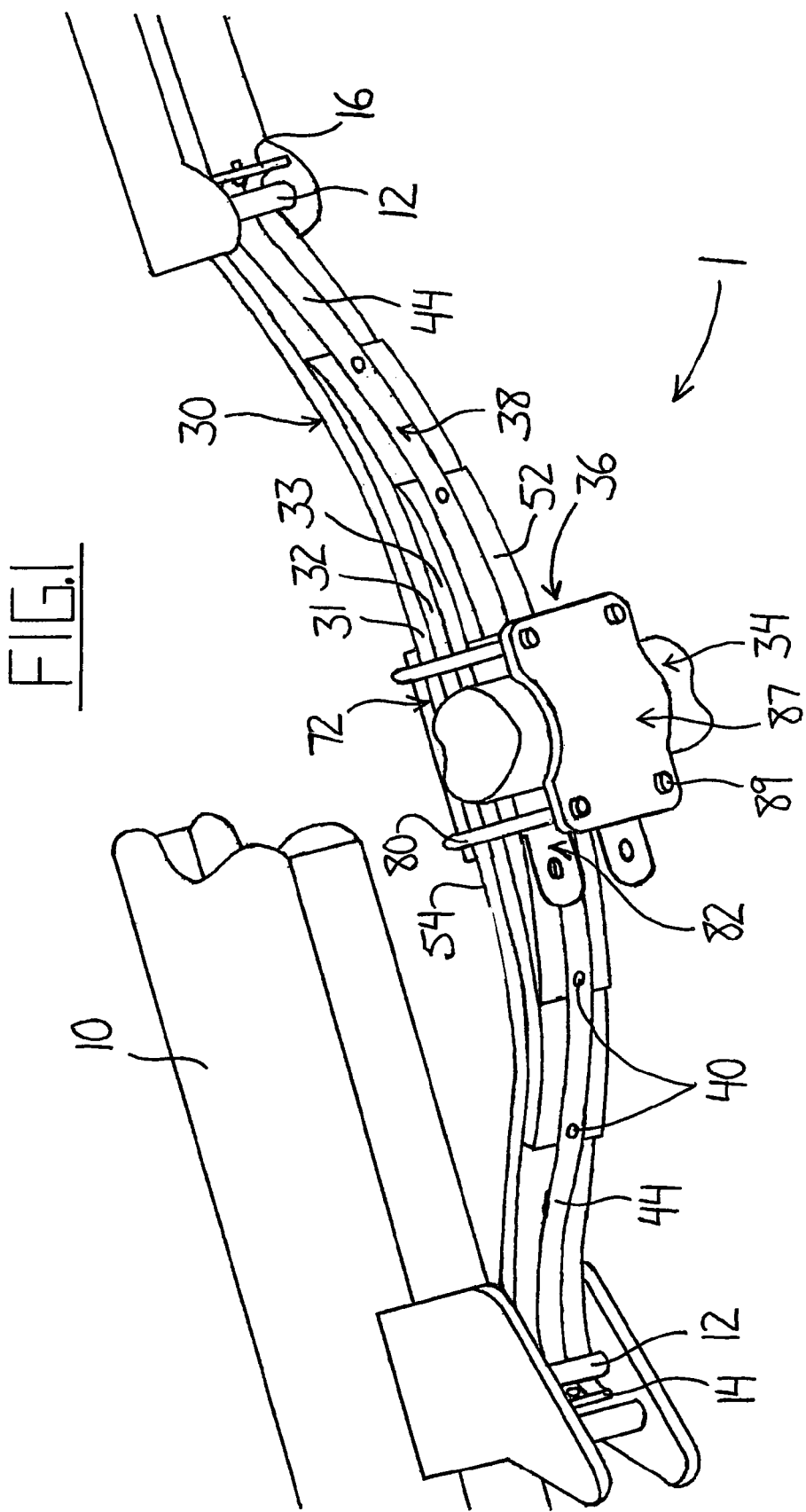
FIG. 1 is an isometric view of a leaf spring assembly according to one embodiment of the present invention.

FIG. 1 shows a leaf spring assembly 1 according to one embodiment of the present invention. As typically found in four spring suspension systems designed to distribute vehicle weight between axles, a leaf spring assembly 1 is mounted on the vehicle frame 10 by spring hangers 12. The leaf spring assembly 1 features a stack 30 of progressively shorter leaf springs 31 to 33 that are connected to an axle 34 by means of a mounting coupling 36. The top spring 31 is the longest and has ends 14 and 16 adapted to engage the hangers 12 by means of downwardly curved portions. The spring leaf assembly 1 of the present invention features the addition of a safety strap 38 extending along the bottom of the stack 30 of leaf springs 31 to 33. The strap 38 acts as a retaining device and is attached to each leaf spring 31 to 33 at opposite ends by rivets 40. In this arrangement, the leaf springs 31 to 33 are connected to each other on either side of the mounting coupling 36 such that if any spring 31 to 33 fails and breaks into two separate pieces, both pieces will remain connected to the other springs of the stack 30.

FIG. 3 shows an exploded view of the leaf spring stack 30 and safety strap 38 of the leaf spring assembly 1 of FIG. 1. The leaf springs 31 to 33 are held in the stacked relationship shown by a leaf fastener 60. The bolt-like fastener 60 is made up of a shaft portion 64 having opposite end portions 62 and 66. End portion 62 forms a head fixed on one end of the shaft portion 64 while end portion 66 is in the form of a nut that is threaded onto the other end of the shaft 64 opposite the head portion 62. Each of the end portions 62 and 66 has a diameter greater than the shaft portion 64, thereby defining shoulders 63 and 65 respectively. The strap 38 includes a central portion 42 having side portions 44 extending outward toward opposite ends 14 and 16 of the leaf spring stack 30. At the center of the stack 30 and the strap 38, there is provided aligned holes 70 through the strap 38 and leaf springs 31 to 33. The shaft portion 64 of the leaf fastener 60 is passed through the holes 70 and the nut 66 is threaded onto the shaft 64 such that the shoulders 63 and 65 of the end portions 62 and 66 engage the strap 38 (adjacent the bottom surface 52) and the top surface 54 of the stack 30 respectively. This clamps the springs 31 to 33 in the stacked relationship shown. The strap is attached to each leaf spring 31 to 33 at opposite ends thereof by rivets 40. The rivets are passed through holes 48 in the side portions 44 of the strap 38 into corresponding aligned holes 50 in the leaf springs 31 to 33. The strap 38 extends along the entire bottom of the stack 30.

Figure 2:
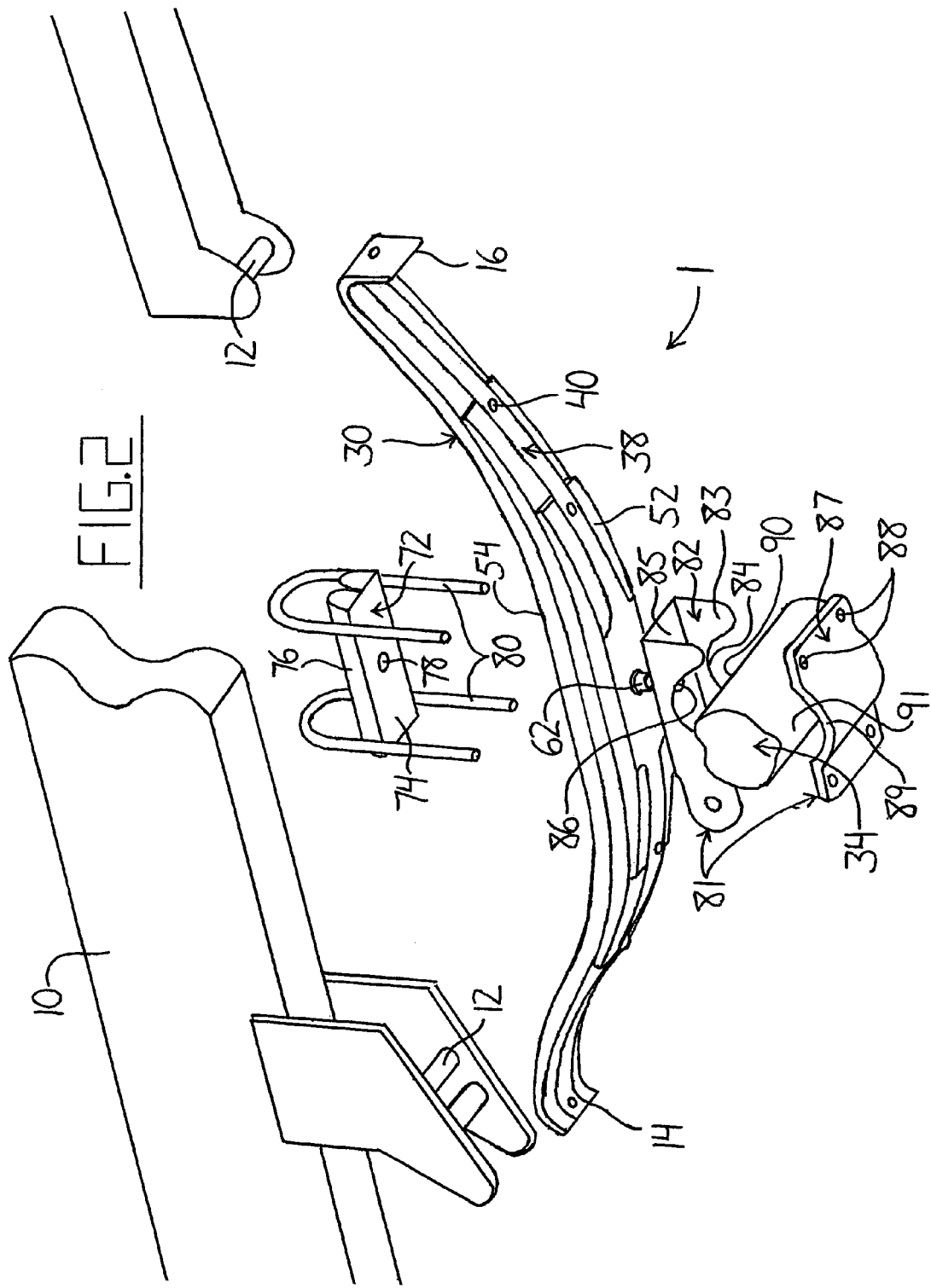
FIG. 2 is an exploded isometric view of the leaf spring assembly of FIG. 1.

FIG. 2 provides further details on the components of the leaf spring assembly 1. The mounting coupling 36 connects the leaf spring stack 30 to the axle 34 at the center of the stack, which corresponds to the position of the leaf fastener 60. The mounting coupling 36 includes a first mounting element 72 provided above the spring stack 30. This first mounting element 72 includes a plate portion 74 for engagement with the top surface 54 of the stack 30 and a curved upper portion 76 atop the plate portion 74. A hole 78 is provided in the first mounting element 72 for receiving the nut end portion 66 of the leaf fastener 60 which is disposed on the top surface 54 of the stack so that the plate portion 74 may sit flush against the top surface 54. The mounting coupling 36 also includes a second mounting element 81 is provided beneath the spring stack 30. The second mounting element 81 includes a first cradle 82 in the form of a channel having side walls 83 with arcuate recessed portions 84 for engaging a first side surface 90 of the axle 34. The first cradle 82 also has a generally flat portion 85 for connecting the side walls 83 having a hole 86. Similar to hole 78 in the first mounting element 72, hole 86 receives the head end portion 62 of the leaf fastener 60 so that the flat portion 85 can sit in contact with the strap 38 adjacent the bottom surface 52 of the stack 30. The second mounting element 81 includes a second cradle 87 located beneath the first cradle 82 such that the axle 34 is housed between them. The second cradle 87 is formed from a generally flat plate having been shaped to define an curved portion 89 for receiving a second side surface 91 of the axle 34 opposite the first side surface 90. The first and second mounting elements 72 and 81 are connected by U-bolts 80. The U-bolts 80 are engaged about the curved portion 76 of the first mounting element 72 and passed through holes 88 provided in the second cradle 87. As shown in FIG. 1, the U-bolts are torqued by nuts 89 to clamp together, from top to bottom, the first mounting element 72, the leaf spring stack 30, the strap 38, the first cradle 82, the axle 34 and the second cradle 87.

The clamping of the strap 38 between the first cradle 82 and the bottom surface 52 of the leaf spring stack 30 by the U-bolts 80 serves to secure the strap 38 to the axle 34. If a leaf spring should fail, the failure normally occurs at an end of the first mounting element 72, or in other words, near the area at which the leaf spring stack 30 is clamped to the axle 34. With the strap 38 secured to the axle 34 by clamping and each leaf spring 31 to 33 attached at its ends to the strap 38, any leaf spring 31 to 33 will remain connected to the other leaf springs should failure occur in this area causing the leaf spring to break into two pieces. Without the strap 38, one of these pieces would remain in the stack 30 as a result of the fastener 60, but the other piece would no longer be connected to the stack 30 and the axle 34 and therefore would likely break free from the vehicle and present a hazard to other road users. The strap maintains connection between the leaf springs 31 to 33 and axle 34, thereby decreasing the hazards commonly associated with spring failure. This reduces the risk of potential harm caused by overloading or misapplication of a spring leaf assembly.

It should be appreciated that the above description outlines only a single embodiment of the present invention, to which modifications can be made without deviating from its function. The retaining device connecting the leaf springs 31 to 33 on opposite sides of the leaf fastener does not have to be a strap 38. The retaining device also does not have to be a continuous piece as long as it serves to connect adjacent ones of the springs 31 to 33 in the stack 30. In addition, the retaining device may be attached to the springs by means of other fasteners known to those of skill in the art, such as bolts. The retaining device does not have to extend the full length of the leaf spring stack 30, as it can be attached to the springs 31 to 33 at points on each side of the leaf fastener 60 other than the points shown at the ends of the springs. The retaining device also may be attached to each spring at more than two points.

Alternate means of mounting leaf spring stacks for various uses are known to those of skill in the art and can vary according to the particular application. It should be appreciated that the strap 38 or a similar retaining device can be readily applied to maintain connection of a plurality of stacked leaf springs 31 to 33 regardless of the mounting details. As an example, different mounting couplings 36 are well known to those of skill in the art. The described embodiment features an inverted U-bolt mounting coupling 36 with the axle 34 under-slung beneath the spring stack 30. The inverted U-bolt mounting coupling 36 can also be oriented to clamp the axle 34 in an over-slung position above the spring stack 30. In such a case, the first mounting element 72 would be disposed on the bottom surface 52 of the stack and the second mounting element 81 would be disposed on the top surface 54 (in other words, the coupling would be rotated 180 degrees from its illustrated position about a longitudinal axis of the spring stack 30). In this case, the strap 38 would be clamped between the bottom surface 52 of the stack 30 and the first mounting element 72.

The retaining device can also be used with a standard U-bolt mounting coupling in which there is no second cradle 87. In such an arrangement, the U-bolts engage around the axle 34 instead of the first mounting element 72. The first mounting element is typically a flat plate with holes through which the U-bolt legs pass and are threaded with nuts 89. Such couplings are well known to those of skill in the art. As in the described embodiment, the strap 38 would be clamped between the bottom surface 52 of the spring stack 30 and the first cradle 82 with the axle 34 in an under-slung position. With the axle in an over-slung position, the strap 38 would be clamped between the bottom surface 52 of the spring stack 30 and the first mounting element (typically a plate).

Finally it should be appreciated that the number of leaf springs in the stack 30 can be varied to correspond to the desired spring characteristics for a particular application and that the ends 14 and 16 of the top leaf spring 31 can be adapted to form a suitable shape for a particular mounting arrangement. As such, the leaf spring assembly according to the present invention is not limited to use within a four spring suspension system.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A leaf spring assembly comprising:
   a plurality of stacked leaf springs including a top spring defining a top surface and a bottom spring defining a bottom surface;
   a leaf fastener arranged to hold said leaf springs in a stacked relationship; and
   a retaining device attached to each leaf spring individually at points on opposite sides of the leaf fastener to connect adjacent leaf springs of the plurality of stacked leaf springs on each side of said leaf fastener;
   the retaining device thereby arranged such that if any one of the leaf springs break into two pieces between the leaf fastener and one of the points, only one of said two pieces thereby being held in the stacked relationship by the leaf fastener, the other one of said two pieces remains connected to at least one other leaf spring.

2. The leaf spring assembly according to claim 1 further comprising retaining device fasteners attaching the retaining device to each leaf spring on the opposite sides of the leaf fastener.

3. The leaf spring assembly according to claim 1 wherein the retaining device is disposed beneath and adjacent to the plurality of stacked leaf springs.

4. The leaf spring assembly according to claim 1 wherein the retaining device comprises a strap.

5. The leaf spring assembly according to claim 1 wherein the retaining device extends from a first end of the plurality of stacked leaf springs to a second end thereof opposite said first end.

6. The leaf spring assembly according to claim 1 wherein the retaining device is attached to each leaf spring at opposite ends thereof.

7. The leaf spring assembly according to claim 4 further comprising a mounting coupling arranged for attachment to the stacked leaf springs.

8. The leaf spring assembly according to claim 7 wherein the mounting coupling comprises a first mounting element arranged for placement against either one of the top surface and the strap adjacent the bottom surface and a second mounting element arranged for placement against the other one of the top surface and the strap adjacent the bottom surface in opposition to the first mounting element such that said strap is clamped between the bottom spring and one of the first and second mounting elements.

9. The leaf spring assembly according to claim 8 wherein the first and second mounting elements are clamped together by bolts.

10. The leaf spring assembly according to claim 8 further comprising an axle wherein the second mounting element comprises a first cradle arranged for engaging a first side face of the axle.

11. The leaf spring assembly according to claim 10 wherein the first mounting element comprises a plate.

12. The leaf spring assembly according to claim 10 wherein the second mounting element further comprises a second cradle arranged for engaging a second side face of the axle opposite the first side face to clamp the axle between the second first and second cradles and the first cradle between the axle and the first mounting element.

13. The leaf spring assembly according to claim 8 wherein each of the first and second mounting elements have a hole, said holes arranged to receive opposite end portions of the leaf fastener, each end portion disposed on a respective one of the top and bottom surfaces of the plurality of stacked leaf springs.

14. The leaf spring assembly according to claim 13 wherein the opposite end portions of the leaf fastener are connected by a shaft portion passing through aligned holes in the leaf springs and the strap, each end portion defining a shoulder abutting a respective one of the top surface and said strap adjacent the bottom surface such that said leaf springs and said strap are clamped between said shoulders.

15. A leaf spring assembly comprising:
 a plurality of stacked leaf springs;
 a leaf fastener to hold the leaf springs in a stacked relationship; and
 a retaining device extending along the plurality of stacked leaf springs beneath and adjacent to said plurality of stacked leaf springs;
 the retaining device being attached to each leaf spring individually at points on opposite sides of the leaf fastener to connect adjacent leaf springs of the plurality of stacked leaf springs on each side of said leaf fastener;
 the retaining device thereby arranged such that if any one of the leaf springs break into two pieces between the leaf fastener and one of the points, only one of said two pieces thereby being held in the stacked relationship by the leaf fastener, the other one of said two pieces remains connected to at least one other leaf spring.

16. The leaf spring assembly according to claim 15 wherein the retaining device comprises a strap.

17. The leaf spring assembly according to claim 15 wherein the retaining device extends from a first end of the plurality of stacked leaf springs to a second end thereof opposite said first end.

18. The leaf spring assembly according to claim 15 wherein the retaining device is attached to each leaf spring at opposite ends thereof.

19. The leaf spring assembly according to claim 15 further comprising retaining device fasteners attaching the retaining device to each leaf spring on opposite sides of the leaf fastener.

* * * * *